United States Patent

[11] 3,581,623

| [72] | Inventor | Maso Galbarini<br>Pavia, Italy |
|---|---|---|
| [21] | Appl. No. | 814,039 |
| [22] | Filed | Apr. 7, 1969 |
| [45] | Patented | June 1, 1971 |
| [73] | Assignee | Innocenti Societa Generale Per L'Industria<br>Metallurgica E Meccanica<br>Milan, Italy |
| [32] | Priority | Dec. 27, 1968 |
| [33] | | Italy |
| [31] | | 54450A/68 |

[54] MILLING-BORING MACHINES
2 Claims, 6 Drawing Figs.

[52] U.S. Cl. .................................................. 90/14,
90/15/, 90/16/, 77/3
[51] Int. Cl. ..................................................... B23c 1/10,
B23d 39/02
[50] Field of Search .................................... 90/11,
14, 15, 16, 164, 77/4, 3

[56] References Cited
UNITED STATES PATENTS
1,848,915  3/1932  Trosch ........................ 90/(164)

| 2,696,763 | 12/1954 | Daugherty et al. | 90/15 |
| 2,899,869 | 8/1959 | Daugherty | 90/16 |
| 3,008,381 | 11/1961 | Jones | 90/16 |
| 3,233,521 | 2/1966 | Ford | 90/16 |

*Primary Examiner*—Gil Weidenfeld
*Attorney*—Sughrue, Rothwell, Mion, Zinn and MacPeak ABSTRACT: A portal-type milling-boring machine has two columns disposed on opposite sides of a bed over which a workpiece-supporting table moves, a beam extending between the two columns over said bed. Working heads are carried by the columns and the beam for effecting different machining operations on a workpiece, and the columns are movable on respective transverse guides parallel to the axis of the beam to vary the effective width of the portal. This enables boring operations to be effected on the sides of the workpiece by the working heads carried by the columns. Suspensions are provided for transmitting the weight of the beam and the heads carried thereby to fixed auxiliary columns.

MILLING-BORING MACHINES

This invention relates to milling-boring machines of the so-called portal or planer type In known such milling-boring machines of this type the workpiece is mounted on a table which travels below a beam supported by two columns disposed on opposite sides of the path of movement of the table. Respective working heads are slidable along the beam and the columns for machining the workpiece from different respective directions. The beam is generally adjustable in height, whereas the two columns are stationary. This results in a poor adaptability of the machine to the machining of workpieces of different widths.

Moreover, satisfactory boring operations are not in general possible with working heads carried by the columns of such a known portal-type machine, since only limited extraction movement of the heads is permitted. Consequently, machining operations of the kind requiring a considerable working head stroke length, understood as the sum of the approach and working stroke of the working head, are impractical with such a machine, particularly where the working head in question is large.

An object of the present invention is to provide a milling-boring machine of the portal type, suitable for machining large-sized workpieces, which avoids the above-mentioned drawbacks.

A further object of the invention is to provide a milling-boring machine of the portal type suitable for machining workpieces the width of which is variable within wide limits. More particularly, the invention aims to provide such a milling-boring machine with which it is possible to carry out important boring operations on a workpiece by utilizing working heads carried by the columns.

The present invention accordingly provides a milling-boring machine of the said portal type which is characterized in that the columns are slidable over guides in a direction parallel to the longitudinal axis of the beam, permitting variation of the effective width of the portal defined between the columns.

This feature enables the two columns to be moved towards or away from the workpiece-supporting table as required so as to cause the working heads carried by the columns to approach or recede from the lateral surfaces of the workpiece even though the workpiece may vary in width, while still maintaining the possibility of adjusting the height of the beam. Moreover, the machine according to the invention enables the movement of the two columns to be utilized for effecting important boring operations on either side of a workpiece.

The invention will be more clearly understood from the following detailed description, given by way of example only, with reference to the accompanying drawings, wherein.

Figure 1:
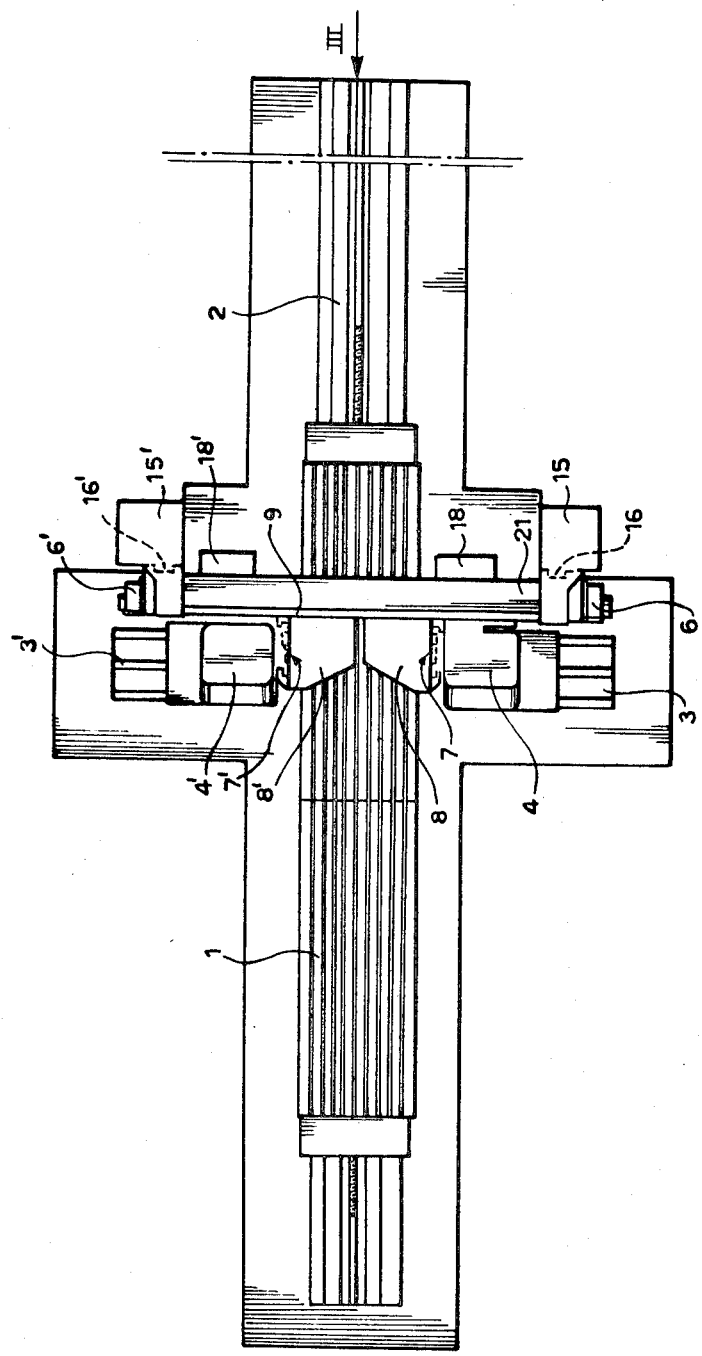
FIG. 1 is a plan view of a portal-type milling-boring machine according to an embodiment of the invention.
Figure 2:
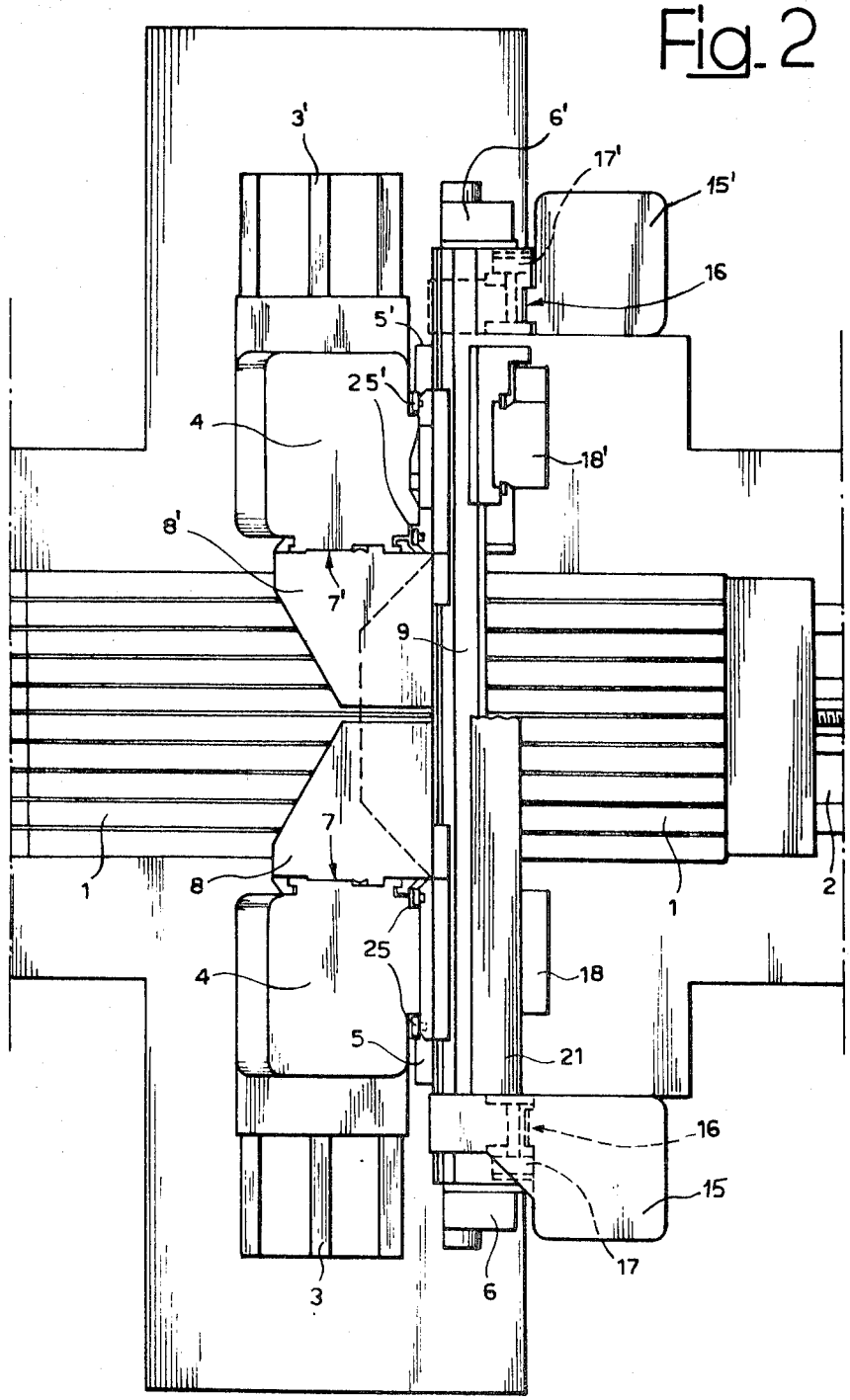
FIG. 2 shows a detail of FIG. 1 on an enlarged scale.
Figure 3:
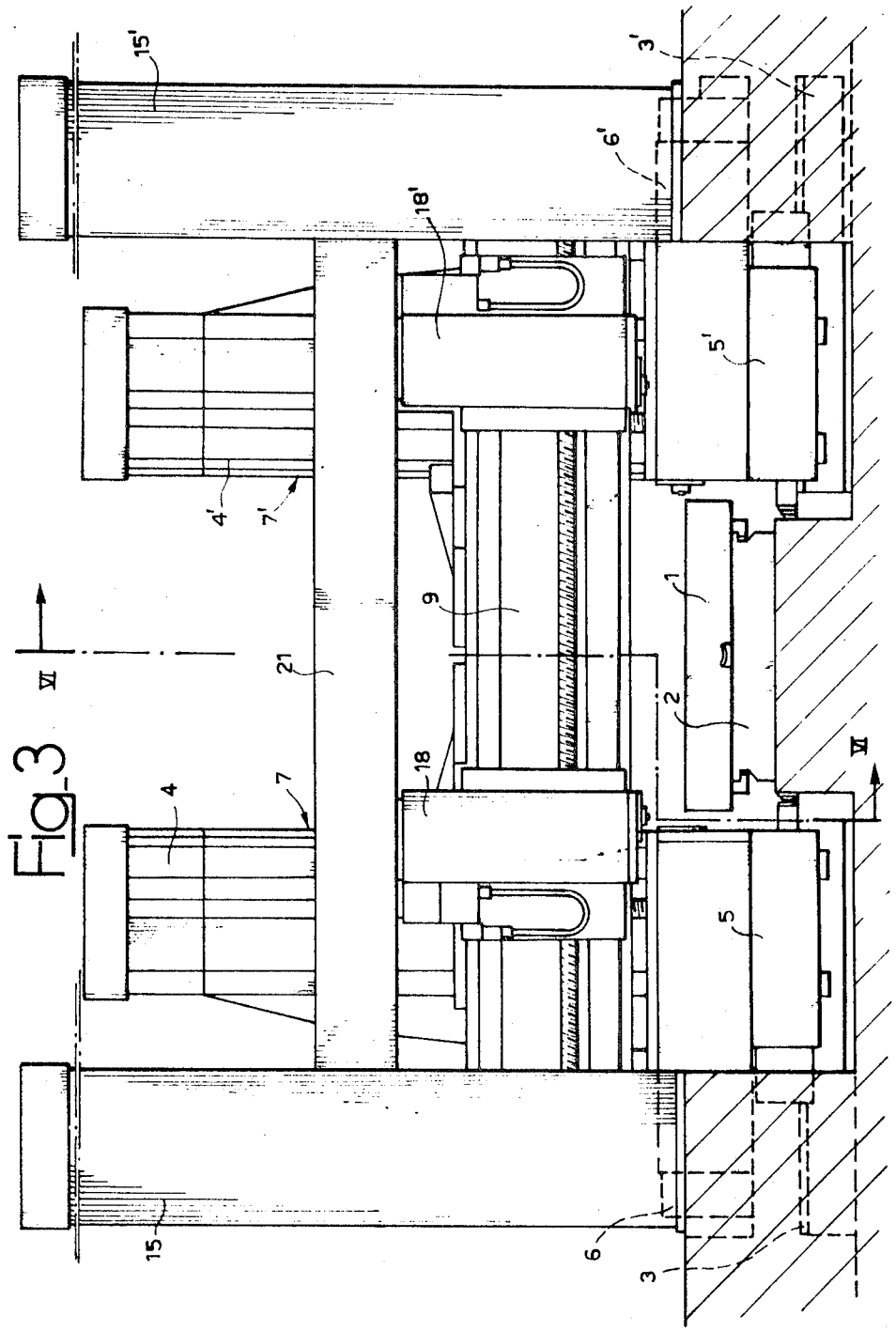
FIG. 3 is an elevational view of the machine on arrow III of FIG. 1.
Figure 4:
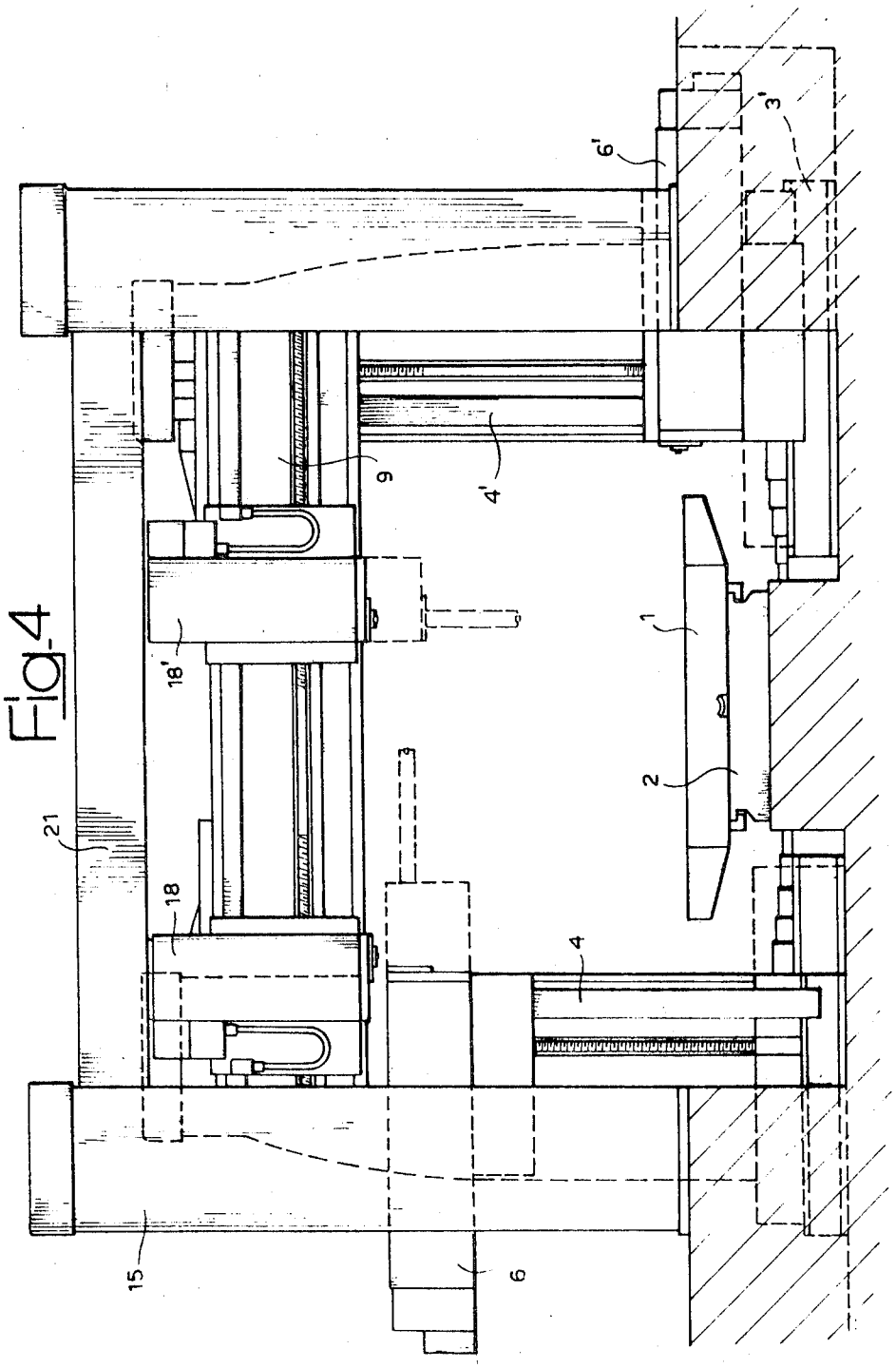
FIG. 4 is a similar view to FIG. 3 showing the machine in a different operating condition.

Referring to the drawings, a portal-type milling machine is shown having a workpiece-supporting table 1 which slides upon an elongated horizontal bed 2 and is moved thereover by means of control devices of known type not shown in the drawings.

Two horizontal beds 3, 3' are arranged on opposite sides of the bed 2 and extend perpendicularly to the latter. Respective vertical columns 4, 4' are supported on the beds 3, 3' for sliding movement towards and away from the bed 2 by a conventional drive means, such as a rack and pinion or any other well known drive means for use in machine tools.

Respective slides 5, 5' are movable vertically by means of a suitable drive along the columns 4, 4'. Each slide 5, 5' has a respective working head 6, 6' mounted therein for horizontal controlled movement towards and away from the bed 2.

The columns 4, 4' are provided with auxiliary vertical guides 7, 7' along which respective brackets 8, 8' are vertically movable. The brackets 8, 8' can be effectively locked to the columns 4, 4' by conventional locking or clamping means not shown in the drawings.

A horizontal beam 9 extends between the columns 4, 4' above the bed 2 and is connected to the columns 4, 4' through the respective brackets 8, 8' by means of roller guides 10 of conventional type which permit relative horizontal movement of the brackets 8, 8' along the beam 9. The roller guides 10 could be replaced by other known guide means such as low friction hydrostatically lubricated sliding bearings. The brackets 8, 8' can moreover be securely locked to the beam 9 by a plurality of releasable hydraulic locks or clamps 11 (shown in broken outline in FIG. 6) located in the brackets 8, 8' and having movable pistons with enlarged heads which are engaged in longitudinal keyways 12 of T-shaped cross section in the beam 9.

Figure 6:
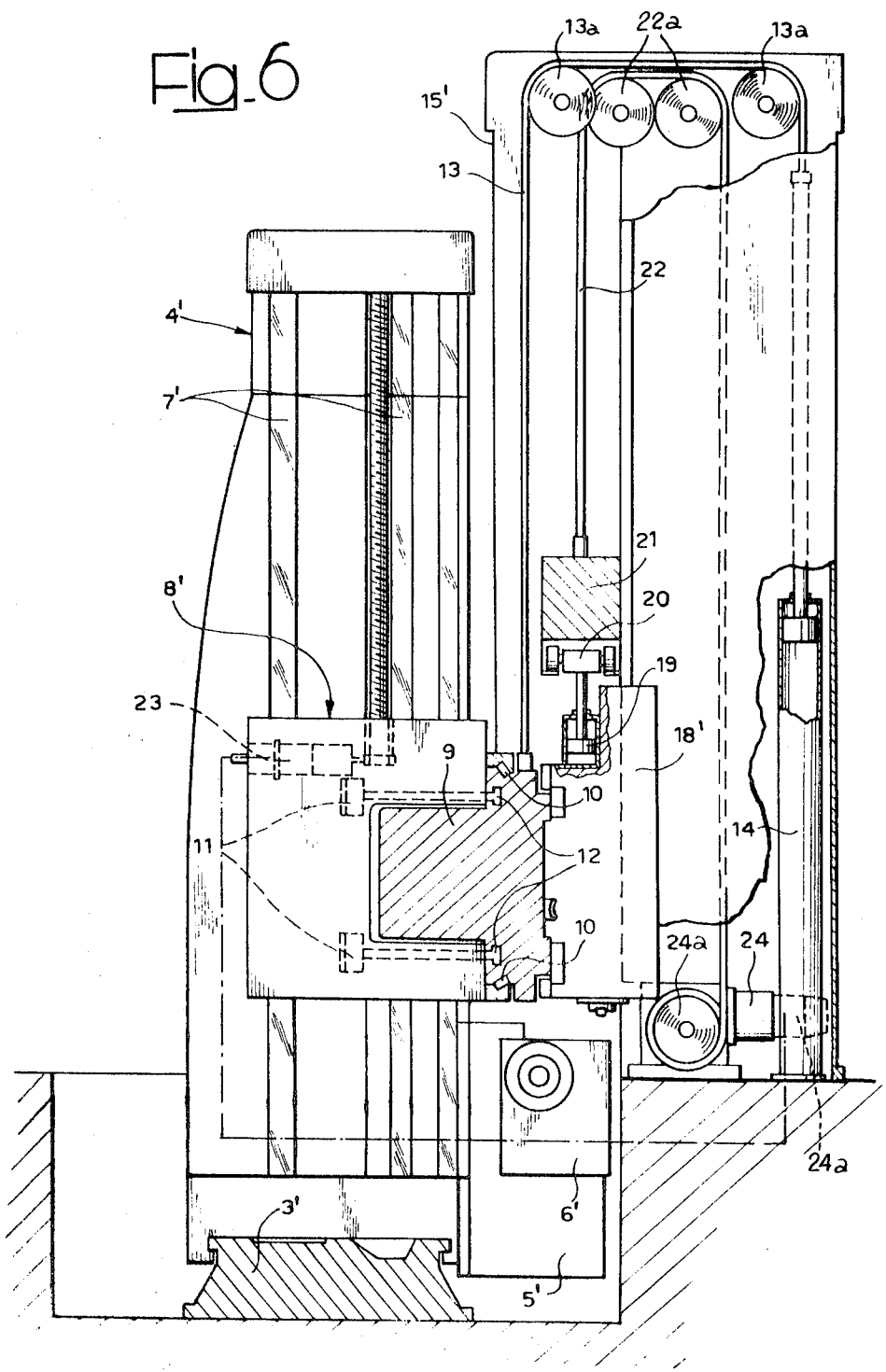
FIG. 6 is a partly cut away sectional view on line VI-VI of FIG. 3.

The weight of the beam 9 is fully supported by two hydraulic balancing systems, comprising cables 13 (one of which is shown in FIG. 6) connected to opposite ends of the beam 9 and passing over fixed guide pulleys 13a to respective hydraulic jacks 14 (one of which is shown in FIG. 6). The two balancing systems are arranged at the ends of the beam 9 within two hollow fixed auxiliary columns 15, 15' to which the weight of the beam 9 is transmitted by the cables 13. The columns 15, 15' have respective vertical guides 16, 16' (indicated by broken lines in FIG. 1) in which the ends of the beam 9 slide, holding the beam 9 against horizontal longitudinal movement. Hydraulic locks 17, 17' are provided for locking the beam 9 to the respective columns 15, 15'.

Working heads 18, 18' are mounted on the beam 9 for sliding movement along the beam. The weight of each head 18, 18' is supported by a respective shock-absorbing cylinder 19 suspended from carriages 20 (one only of which is shown in FIG. 6) which are slidable along a girder 21 extending parallel to the beam 9 above the heads 18, 18'. The girder 21 is supported at each end by cables 22 (one of which is shown in FIG. 6) which pass over fixed pulleys 22a at the top of the respective auxiliary columns 15, 15' and are wound on the drums 24a of respective winches 24 housed within said auxiliary columns.

The winches 24 are driven by respective first electric motors 24a (one of which is indicated in broken outline in FIG. 6). The motors 24a are interconnected by means of respective electrical transmissions, one of which is indicated diagrammatically by a chain-dotted line in FIG. 6, to respective second electric motors 23 (one of which is indicated by broken lines in FIG. 6) which through a known reducing and feed gear effect vertical movement of the tow brackets 8, 8' and the beam 9 relative to the columns 4, 4'. The motors 24a, 23 therefore move in unison, maintaining a substantially constant vertical separation between the girder 21 and the beam 9.

The working heads 18, 18' are therefore capable of sliding movement along the beam 9 without bearing by their weight upon the beam 9, so that changes in the geometrical configuration of the machine, which would result from bending of the beam 9, are avoided.

Figure 5:
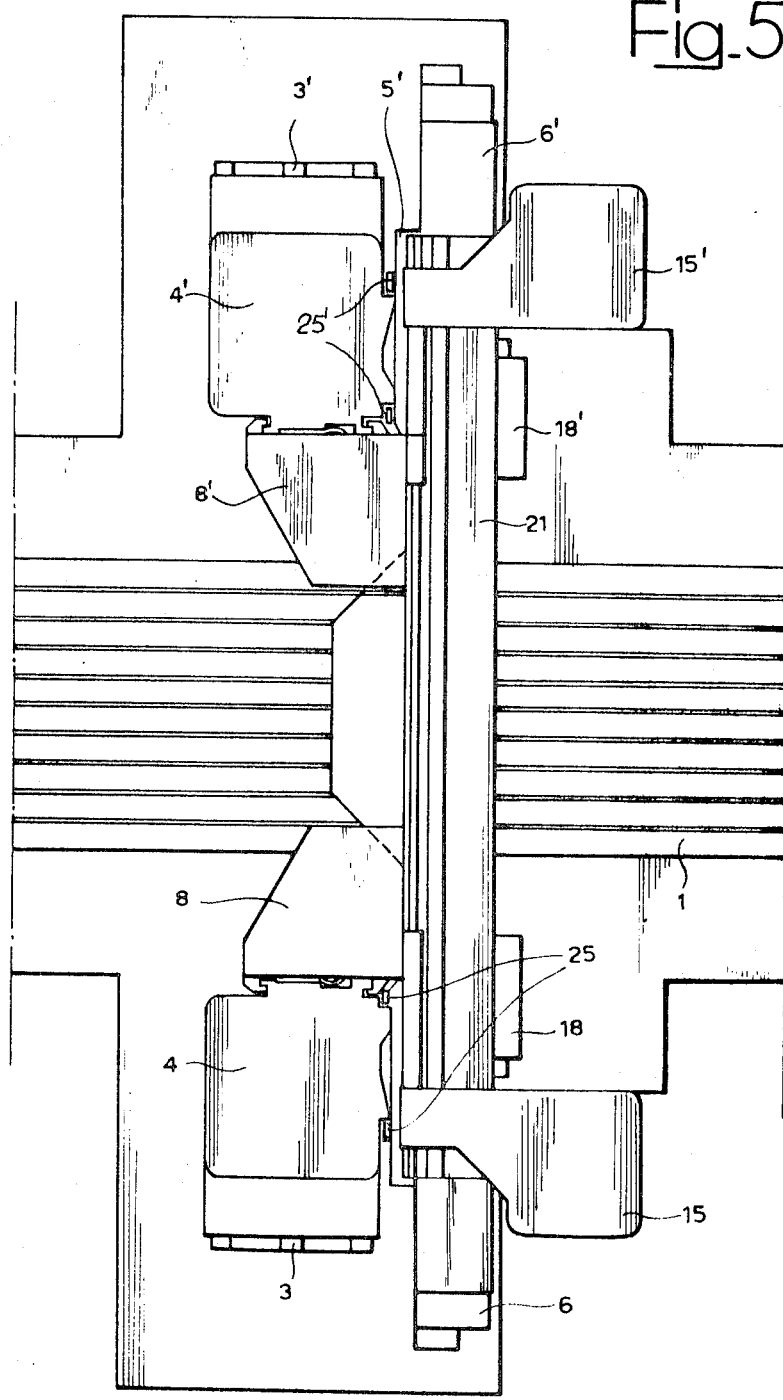
FIG. 5 is a partial plan view of the machine in the condition shown in FIG. 4.

During use of the working heads 18, 18' the beam 9 is clamped to the brackets 8, 8' by the locks 11, 11' and is also clamped directly to the columns 4, 4' by a number of locks or clamps 25, 25' (FIG. 5) which extend from the columns and also engage in the keyways 12 in the beam 9. Moreover, the locks 17, 17' further stiffen the beam 9 by clamping the beam to the two auxiliary columns 15, 15'.

When the locks 11 and 11', 25 and 25' are released, the beam 9 and the working heads 18, 18' are fully supported, through the cables 13 and 22 respectively, by the auxiliary columns 15, 15'. The roller guides 10 then permit the brackets 8, 8' to slide freely, together with the respective columns 4, 4', relative to the beam 9, the columns 4, 4' moving along the beds 3, 3' respectively. This enables the two heads 6, 6' to be employed, for example, for effecting important boring operation on the lateral sides of a workpiece supported on the table 1.

I claim:

1. A milling-boring machine comprising, a workpiece-supporting table, means supporting the table for translational movement thereof, two movable columns positioned on opposite sides of said table, guide means supporting said columns for movement transverse to the path of movement of the table, each column having means adapted for carrying a working head mounted for vertical movement on said columns, two fixed auxiliary columns positioned on opposite sides of said table, a beam horizontally suspended relative to said auxiliary columns, means suspending the beam from said auxiliary columns for vertical movement parallel to itself, said suspending means comprising a hydraulic piston and cylinder assembly mounted in each auxiliary column, pulley means secured to each auxiliary column above said beam, and a cable extending over said pulley means and having one end connected to the beam and the other end to the hydraulic piston, two brackets slidable along said beam and connecting said beam to said movable columns, said brackets being vertically slidable on said movable columns, means for rigidly locking the beam to said movable columns, at least one working head mounted for sliding movement along the beam, a girder extending between said two auxiliary columns and suspended from said auxiliary columns for movement parallel to and at a fixed distance from said beam, and suspension means carried by the girder and supporting the weight of the working head slidable along the beam.

2. A milling-boring machine as claimed in claim 1, wherein, the means for rigidly locking the beam to said columns comprises locking members extending directly from said columns into keyways in the beam, and further including means to rigidly lock the beam to the fixed auxiliary columns.